(12) United States Patent
Nicholson

(10) Patent No.: US 11,053,964 B2
(45) Date of Patent: Jul. 6, 2021

(54) TOW-BAR MOUNTING SYSTEM AND METHOD

(71) Applicant: John Wesley Nicholson, Marrero, LA (US)

(72) Inventor: John Wesley Nicholson, Marrero, LA (US)

(*) Notice: Subject to any disclaimer, the term of this patent is extended or adjusted under 35 U.S.C. 154(b) by 54 days.

(21) Appl. No.: 16/683,163

(22) Filed: Nov. 13, 2019

(65) Prior Publication Data

US 2020/0158148 A1 May 21, 2020

Related U.S. Application Data

(60) Provisional application No. 62/768,046, filed on Nov. 15, 2018.

(51) Int. Cl.
| | | |
|---|---|---|
| *F16B 2/08* | (2006.01) | |
| *B62D 65/16* | (2006.01) | |
| *B60D 1/58* | (2006.01) | |
| *F16B 2/10* | (2006.01) | |
| *B60R 11/00* | (2006.01) | |
| *B25B 5/04* | (2006.01) | |
| *B60D 1/60* | (2006.01) | |
| *B60D 1/145* | (2006.01) | |

(52) U.S. Cl.
CPC ............... *F16B 2/08* (2013.01); *B60D 1/58* (2013.01); *B62D 65/16* (2013.01); *F16B 2/10* (2013.01); *B25B 5/04* (2013.01); *B60D 1/145* (2013.01); *B60D 1/60* (2013.01); *B60Q 2900/10* (2013.01); *B60R 2011/0059* (2013.01)

(58) Field of Classification Search
CPC ... B25B 5/04; B25B 5/14; B25B 5/147; F16B 2/02; F16B 2/06; F16B 9/02; F16B 9/023; F16B 9/05; F16B 2/065; F16B 2/08; F16B 2/10; B60D 1/145; B60D 1/58; B60D 1/60–605; B60Q 2900/10; B60R 2011/0059; B62D 65/16
See application file for complete search history.

(56) References Cited

U.S. PATENT DOCUMENTS

| | | | | |
|---|---|---|---|---|
| 4,730,841 A | * | 3/1988 | Ponder | B60D 1/60 280/501 |
| 5,288,094 A | * | 2/1994 | Putnam | B60D 1/62 248/214 |
| 5,584,495 A | * | 12/1996 | Mason | B60D 1/60 280/507 |

(Continued)

FOREIGN PATENT DOCUMENTS

DE 20018591 U1 * 1/2001 ............ F16L 55/035

*Primary Examiner* — Matthew P Travers
(74) *Attorney, Agent, or Firm* — Keaty Law Firm LLC

(57) ABSTRACT

A tow-bar mounting system and method for removable and adjustable mounting of a variety of accessories upon a tow-bar structure such as a vehicle trailer hitch or bumper, having clamping mount units and inserting mount units, each clamping mount unit having a plain-angled subunit with a hinging tab and a fastening hole, and a mounting angled subunit with a hinging slot, a fastening tab, dual extended mounting arms, and dual accessory mounting holes, and each inserting mount unit having an inserting body, a single extended mounting arm, and dual accessory mounting holes.

20 Claims, 6 Drawing Sheets

(56) References Cited

U.S. PATENT DOCUMENTS

| | | | |
|---|---|---|---|
| 6,976,695 B1* | 12/2005 | Smith, III | B60D 1/28 |
| | | | 280/507 |
| 2005/0225054 A1* | 10/2005 | Budge | B60D 1/06 |
| | | | 280/507 |
| 2009/0115165 A1* | 5/2009 | Coy | B60D 1/241 |
| | | | 280/506 |
| 2011/0031364 A1* | 2/2011 | Kneshtel, Jr. | F16B 2/10 |
| | | | 248/222.14 |
| 2018/0117979 A1* | 5/2018 | Columbia | F16B 1/00 |
| 2018/0135795 A1* | 5/2018 | Palmer | B60D 1/52 |
| 2019/0225037 A1* | 7/2019 | Kang | B60D 1/24 |
| 2020/0016946 A1* | 1/2020 | Fabiano | B60D 1/58 |

* cited by examiner

TOW-BAR MOUNTING SYSTEM AND METHOD

CROSS-REFERENCE TO RELATED APPLICATIONS

This application claims the benefit of my provisional application Ser. No. 62/768,046 filed on Nov. 15, 2018 as covering "Mounting Mechanism for Lights or Accessories to Trailer Hitch or Bumper", the full disclosure of which is incorporated by reference herein and priority of which is hereby claimed.

BACKGROUND OF THE INVENTION

This invention provides a tow-bar mounting system and method for removably and adjustably mounting a variety of accessories upon a tow-bar structure such as a vehicle trailer hitch or bumper.

It is desirable to have mounts on a trailer hitch that can allow for the attachment of a variety of accessories such as a light, hook, wire, hose, line, sensor, switch, storage, or other device. Furthermore, it is desirable to have mounts that can easily clamp for use onto a trailer hitch. Still further, it is desirable to have mounts or adapters than can slide into existing openings and be attached. The disclosed device advantageously fills these needs and addresses deficiencies in the prior art by providing an easy way to attach a variety of accessories to a hitch.

SUMMARY OF THE INVENTION

This invention provides a tow-bar mounting system and method for removable and adjustable mounting of a variety of accessories upon a tow-bar structure such as a vehicle trailer hitch or bumper, having clamping mount units and inserting mount units, each clamping mount unit having a plain-angled subunit with a hinging tab and a fastening hole, and a mounting angled subunit with a hinging slot, a fastening tab, dual extended mounting arms, and dual accessory mounting holes, and each inserting mount unit having an inserting body, a single extended mounting arm, and dual accessory mounting holes.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
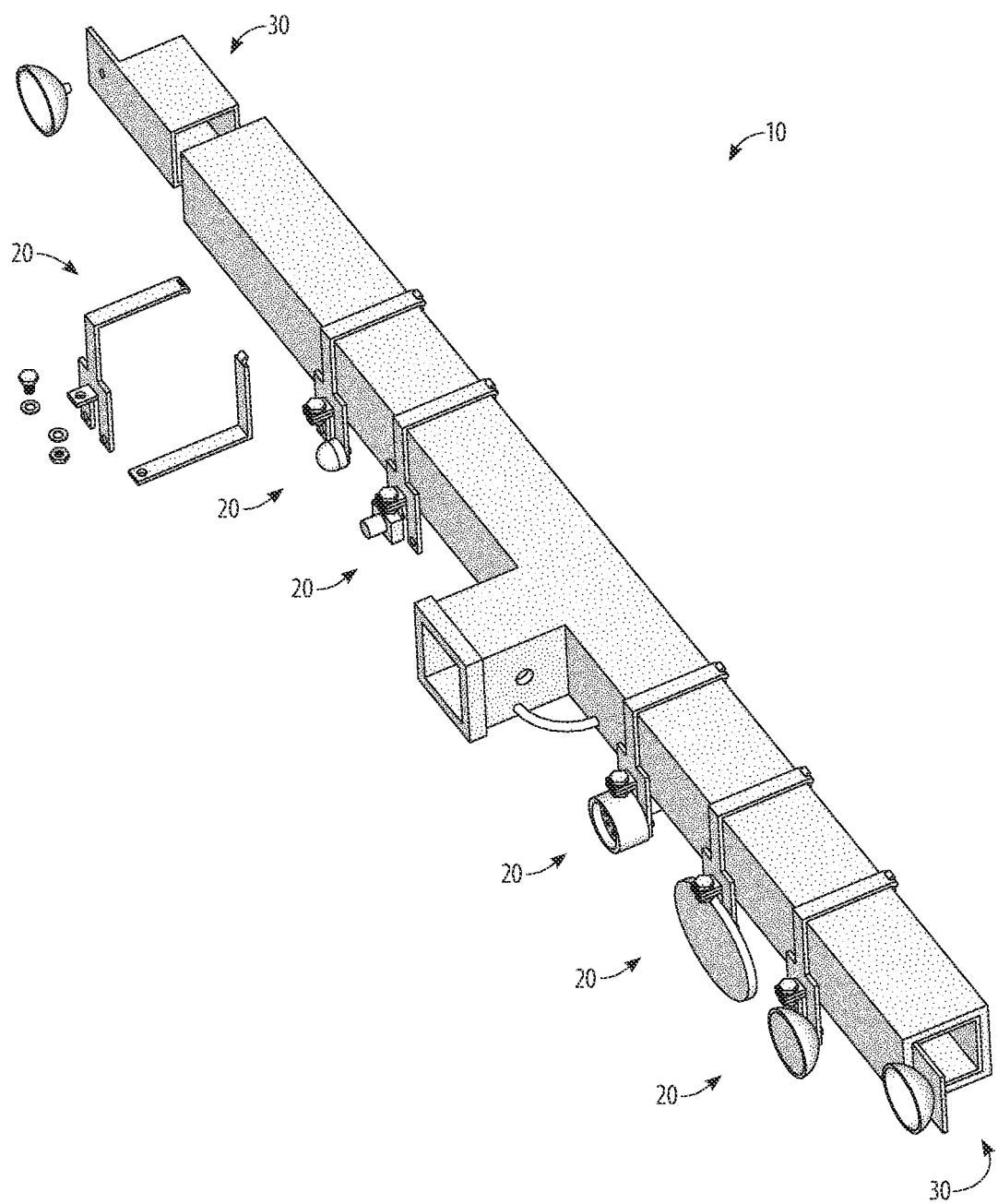
FIG. 1 is a schematic view of the tow-bar mounting system and method of the invention in use.

Referring to FIG. 1, the tow-bar mounting system 10 provides for the removable and adjustable attaching of a variety of accessories to a vehicle's tow-bar structure such as a bumper or trailer hitch, as shown. The tow-bar mounting system 10 provides clamping mount units 20 and inserting mount units 30 for attaching accessories, such as the lights, reflector, electrical socket, camera, and sensor shown.

The clamping mount units 20 and the inserting mount units 30 are made of material suitable to the purpose and to the vehicle-bumper environment and conditions. A metal such as steel is appropriate if it is inherently rust-proof or is coated with a paint, epoxy, bonded powder coating, or rubberized coating, or is otherwise treated to resist rust.

Figure 2:
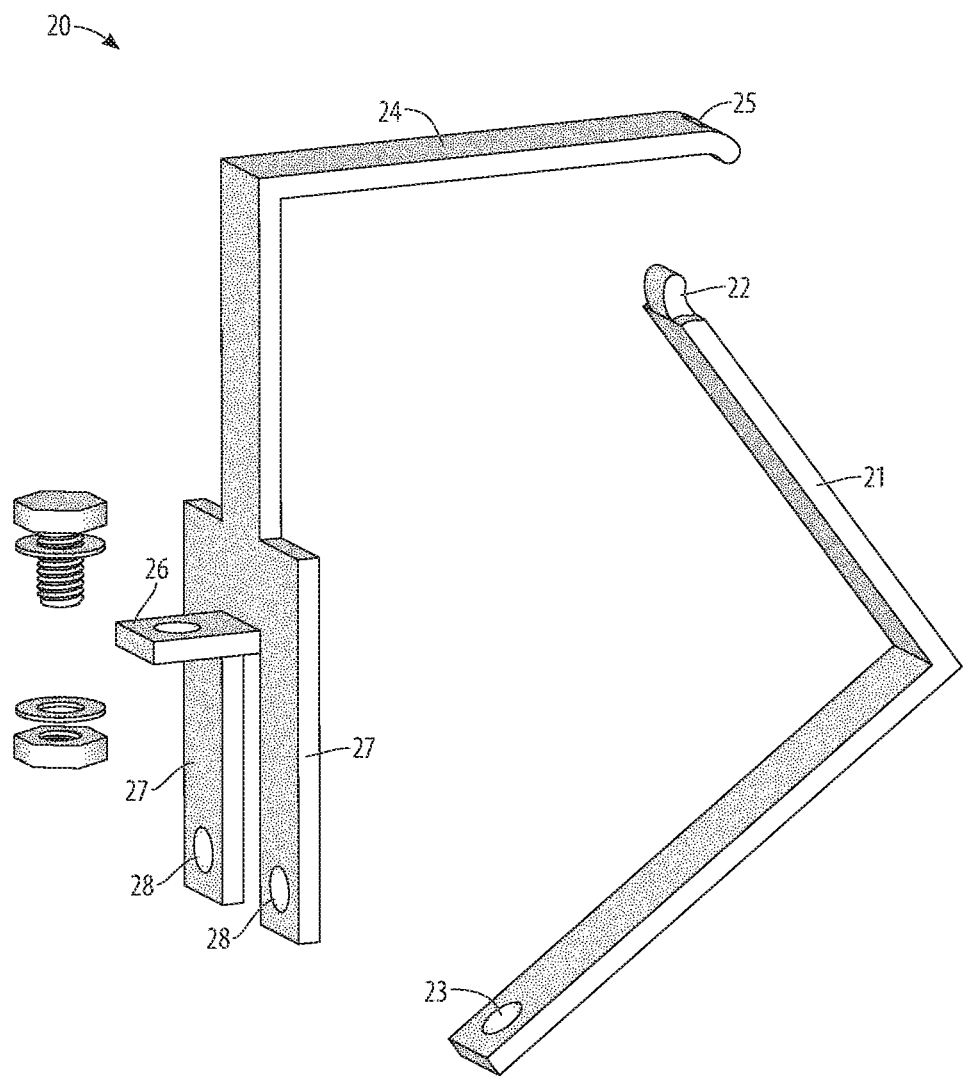
FIG. 2 is a perspective view of the clamping mount unit of the tow-bar mounting system and method of the invention disassembled.

Referring to FIG. 2, each clamping mount unit 20 is in the form of a two-part hinged clamp. Each clamping mount unit 20 provides a plain angled subunit 21 and a mounting angled subunit 24 which can be fit together to surround the tow-bar structure, and can be fastened around the tow-bar structure. The plain angled subunit 21 has at one end a hinging tab 22 and near the other end a fastening hole 23. The mounting angled subunit 24 has at one end a hinging slot 25 and at the other end a fastening tab 26 and dual extended mounting arms 27 having corresponding dual accessory mounting holes 28. The hinging tab 22 and the corresponding hinging slot 25 can be fit together to provide a hinge, as shown.

Figure 3:
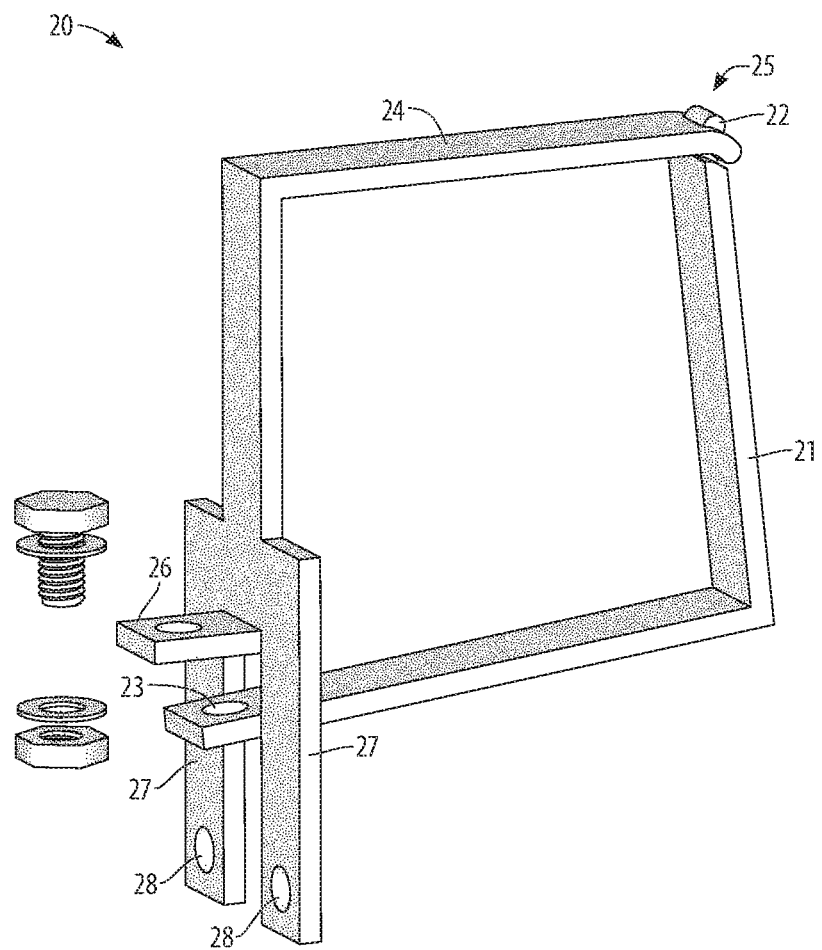
FIG. 3 is a perspective view of the clamping mount unit of the tow-bar mounting system and method of the invention partially assembled.
Figure 4:
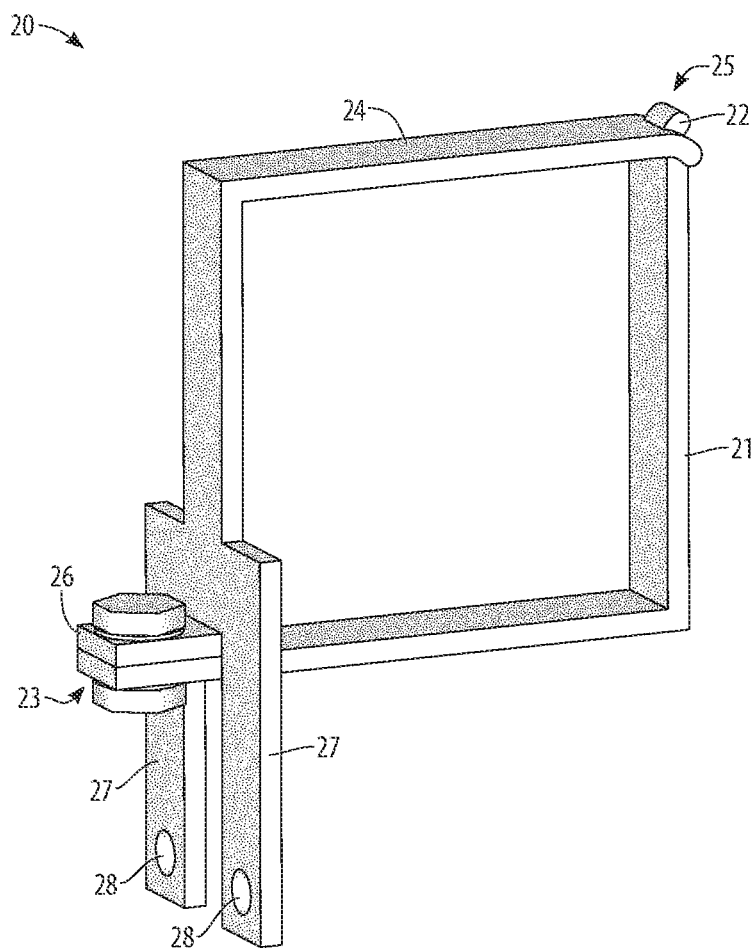
FIG. 4 is a perspective view of the clamping mount unit of the tow-bar mounting system and method of the invention assembled.

Referring additionally to FIG. 3 and FIG. 4, in use, a clamping mount unit 20 is fastened to the tow-bar structure by placing the separate plain angled subunit 21 and mounting angled subunit 24 around the tow-bar, placing the hinging tab 22 into the hinging slot 25, thereby joining the subunits in a hinged joint, bringing the free end of the plain angled subunit 21 close to the fastening tab 26 of the mounting angled subunit 24, and fastening the free end of the plain angled subunit 21 and the fastening tab 26 together, thereby clamping upon the tow-bar structure. The fastening tab 26 is provided with a hole corresponding to the fastening hole 23 of the free end of the plain angled subunit 21, and the fastening can be accomplished using a bolt and nut, as shown, or another fastener, including a locking fastener or a one-way screw.

Figure 5:
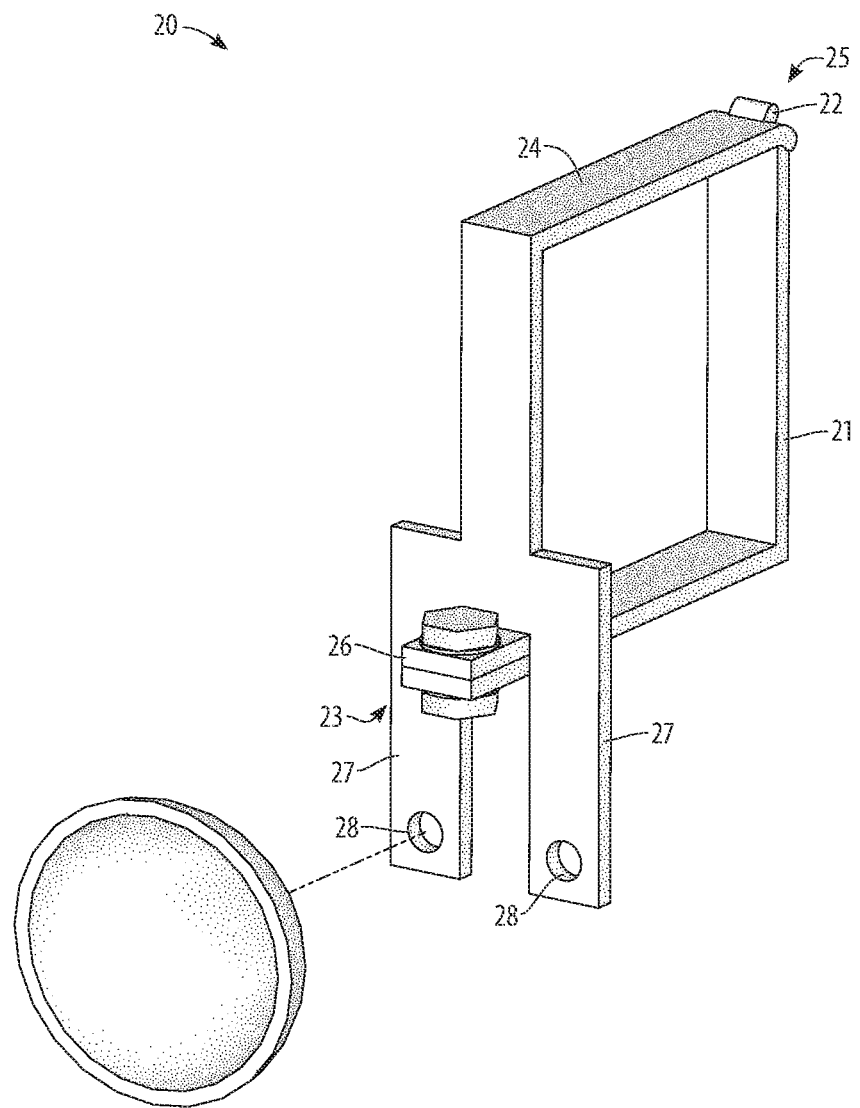
FIG. 5 is a perspective view of the clamping mount unit of the tow-bar mounting system and method of the invention in use.

Referring to FIG. 5, in use, an accessory, such as the light shown, is mounted to the mounting angled subunit 24 through one or both of the dual accessory mounting holes 28. The use of both of the dual accessory mounting holes 28 for one accessory is appropriate for achieving a mounting which will not rotate or slip in use. Two accessories of the appropriate size and shape can be mounted to one mounting angled subunit 24, each using one of the dual accessory mounting holes 28.

Figure 6:
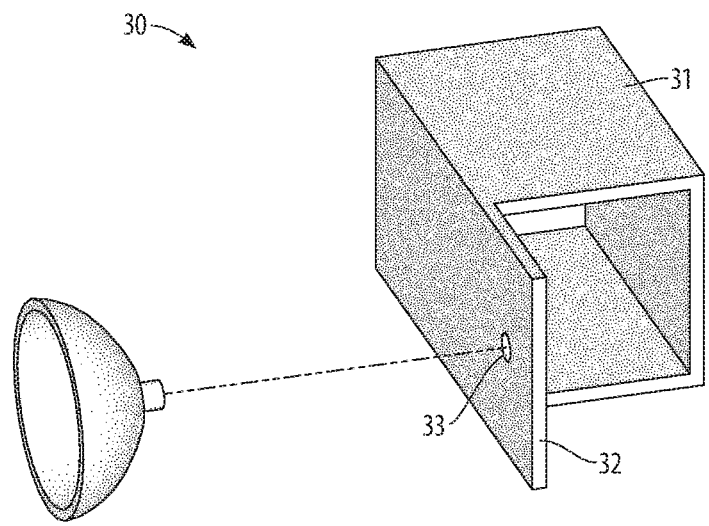
FIG. 6 is a perspective view of the inserting mount unit of the tow-bar mounting system and method of the invention in use.

Referring to FIG. 6, each inserting mount unit 30 is of a form which can be partially inserted into the tow-bar structure to provide an additional mounting point for accessories. The inserting mount unit 30 provides an inserting body 31 and a single extended mounting arm 32 having one or more accessory mounting holes 33. When two accessory mounting holes 33 are provided, a non-rotating or non-slipping attachment can be made, as above.

Figure 7:
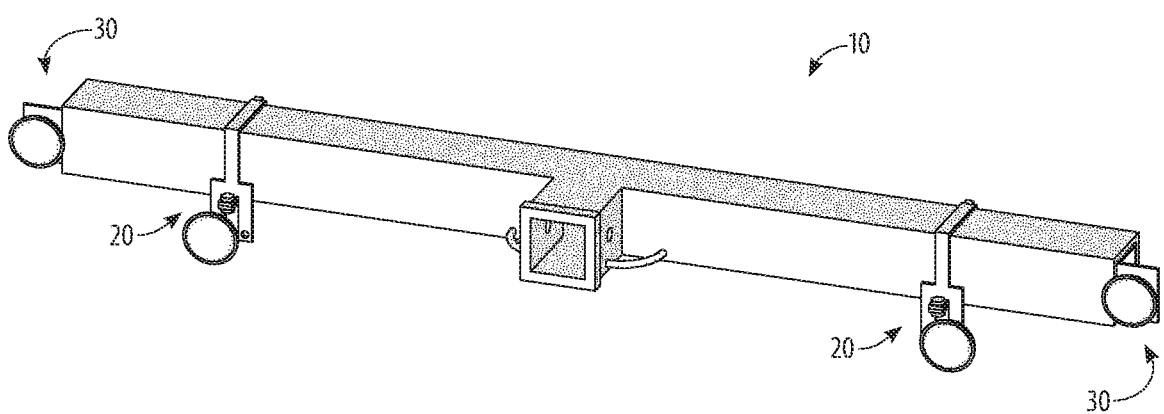
FIG. 7 is a perspective view of the tow-bar mounting system and method of the invention in use.

Referring to FIG. 7, in use on a tow-bar structure such as the vehicle trailer hitch shown, the clamping mount units 20 and inserting mount units 30 of the tow-bar mounting system 10 provide for the removable and adjustable attaching of a variety of accessories to the vehicle's tow-bar structure.

Many other changes and modifications can be made in the system and method of the present invention without departing from the spirit thereof. I therefore pray that my rights to the present invention be limited only by the scope of the appended claims.

I claim:

1. A tow-bar mounting system for mounting of accessories to a tow-bar structure, the tow-bar mounting system comprising:
    (i) at least one clamping mount unit, comprising:
        (a) a plain angled subunit having at one end a hinging tab and near the other end a fastening hole; and
        (b) a mounting angled subunit having at one end a hinging slot adapted to join with said hinging tab of said plain angled subunit to form a hinged joint, having near the other end a fastening tab adapted to be fastened to said plain angled subunit through said fastening hole, and having dual extended mounting arms with dual accessory mounting holes adapted for attaching of accessories; and
    (ii) at least one inserting mount unit, comprising;
        (a) an inserting body adapted to being inserted into the tow-bar structure; and
        (b) a single extended mounting arm adapted to extend outside of the tow-bar structure, having at least one accessory mounting hole adapted for attaching of accessories.

2. The tow-bar mounting system of claim 1, where said clamping mount unit is made of steel.

3. The tow-bar mounting system of claim 1, where said clamping mount unit is protected with paint.

4. The tow-bar mounting system of claim 1, where said clamping mount unit is protected with epoxy.

5. The tow-bar mounting system of claim 1, where said clamping mount unit is protected with bonded powder coating.

6. The tow-bar mounting system of claim 1, where said clamping mount unit is protected with rubberized coating.

7. The tow-bar mounting system of claim 1, where said inserting mount unit further comprises two said accessory mounting holes.

8. The tow-bar mounting system of claim 1, where said fastening tab has a hole corresponding to said fastening hole of said plain angled subunit.

9. The tow-bar mounting system of claim 1, where said plain angled subunit and said fastening tab of said mounting angled subunit are adapted to be fastened with a bolt and nut.

10. The tow-bar mounting system of claim 1, where said plain angled subunit and said fastening tab of said mounting angled subunit are adapted to be fastened with a locking fastener.

11. A tow-bar mounting method of mounting accessories to a tow-bar structure, the tow-bar mounting method comprising:
    (i) providing a tow-bar mounting system comprising:
        (a) at least one clamping mount unit, comprising:
            (1) a plain angled subunit having at one end a hinging tab and near the other end a fastening hole; and
            (2) a mounting angled subunit having at one end a hinging slot adapted to join with said hinging tab of said plain angled subunit to form a hinged joint, having near the other end a fastening tab adapted to be fastened to said plain angled subunit through said fastening hole, and having dual extended mounting arms with dual accessory mounting holes adapted for attaching of accessories; and
        (b) at least one inserting mount unit, comprising;
            (1) an inserting body adapted to being inserted into the tow-bar structure; and
            (2) a single extended mounting arm adapted to extend outside of the tow-bar structure, having at least one accessory mounting hole adapted for attaching of accessories;
    (ii) mounting at least one of the clamping mount unit and the inserting mount unit from said tow-bar mounting system upon the tow-bar structure; and
    (iii) attaching at least one accessory through at least one said accessory mounting hole.

12. The tow-bar mounting method of claim 11, where said clamping mount unit is made of steel.

13. The tow-bar mounting method of claim 11, where said clamping mount unit is protected with paint.

14. The tow-bar mounting method of claim 11, where said clamping mount unit is protected with epoxy.

15. The tow-bar mounting method of claim 11, where said clamping mount unit is protected with bonded powder coating.

16. The tow-bar mounting method of claim 11, where said clamping mount unit is protected with rubberized coating.

17. The tow-bar mounting method of claim 11, where said inserting mount unit further comprises two said accessory mounting holes.

18. The tow-bar mounting system of claim 1, where said fastening tab has a hole corresponding to said fastening hole of said plain angled subunit.

19. The tow-bar mounting method of claim 11, where said plain angled subunit and said fastening tab of said mounting angled subunit are adapted to be fastened with a bolt and nut.

20. The tow-bar mounting method of claim 11, where said plain angled subunit and said fastening tab of said mounting angled subunit are adapted to be fastened with a locking fastener.

* * * * *